(12) United States Patent
Yamamoto et al.

(10) Patent No.: US 9,500,818 B2
(45) Date of Patent: Nov. 22, 2016

(54) LIGHT RECEPTACLE

(71) Applicant: KYOCERA Corporation, Kyoto-shi, Kyoto (JP)

(72) Inventors: Takashi Yamamoto, Kyoto (JP); Kaichiro Nakashima, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/378,707

(22) PCT Filed: Sep. 28, 2012

(86) PCT No.: PCT/JP2012/075155
§ 371 (c)(1),
(2) Date: Aug. 14, 2014

(87) PCT Pub. No.: WO2013/125084
PCT Pub. Date: Aug. 29, 2013

(65) Prior Publication Data
US 2015/0346437 A1 Dec. 3, 2015

(30) Foreign Application Priority Data

Feb. 22, 2012 (JP) .................... 2012-036093
Jun. 29, 2012 (JP) .................... 2012-146619

(51) Int. Cl.
*G02B 6/36* (2006.01)
*G02B 6/38* (2006.01)
(Continued)

(52) U.S. Cl.
CPC ............ *G02B 6/3897* (2013.01); *G02B 6/241* (2013.01); *G02B 6/2746* (2013.01); *G02B 6/3845* (2013.01); *G02B 6/3846* (2013.01)

(58) Field of Classification Search
CPC ..................... G02B 6/3897; G02B 6/241

USPC ........................................... 385/84
See application file for complete search history.

(56) References Cited

U.S. PATENT DOCUMENTS

2005/0105857 A1  5/2005  Ishigami et al.
2006/0133740 A1  6/2006  Nakanishi et al.
(Continued)

FOREIGN PATENT DOCUMENTS

JP    2005-156968 A    6/2005
JP    2005-173534 A    6/2005
(Continued)

OTHER PUBLICATIONS

International Search Report, PCT/JP2012/075155, Oct. 11, 2012, 2 pgs.

(Continued)

*Primary Examiner* — Jerry Blevins
(74) *Attorney, Agent, or Firm* — Volpe and Koenig, P.C.

(57) ABSTRACT

A light receptacle comprises: a column-shaped fiber stub; a cylindrical holder made of an insulating material, the holder being in contact with whole circumference of an outer peripheral surface at one end of the fiber stub and holding the fiber stub; a sleeve being in contact with whole circumference of the outer peripheral surface at the other end of the fiber stub; a first metal case being in contact with whole circumference of an outer peripheral surface of a part of the holder and surrounding the part of the holder and the sleeve; and a second metal case being in contact with whole circumference of an outer peripheral surface of a remaining portion of the holder located outside of the first metal case, leaving a space between the first metal case and the second metal case.

6 Claims, 7 Drawing Sheets

(51) Int. Cl.
  *G02B 6/24* (2006.01)
  *G02B 6/27* (2006.01)

(56) References Cited

U.S. PATENT DOCUMENTS

| | | | | |
|---|---|---|---|---|
| 2006/0274998 | A1* | 12/2006 | Ito | G02B 6/4292 385/92 |
| 2007/0047881 | A1* | 3/2007 | Mizuno | G02B 6/4292 385/92 |
| 2008/0170827 | A1* | 7/2008 | Mitamura | G02B 6/3846 385/78 |
| 2012/0288239 | A1* | 11/2012 | Fujimura | G02B 6/4275 385/92 |

FOREIGN PATENT DOCUMENTS

| | | |
|---|---|---|
| JP | 2006-119577 A | 5/2006 |
| JP | 2006-145987 A | 6/2006 |
| JP | 2007-011287 A | 1/2007 |
| JP | 2007-133225 A | 5/2007 |
| JP | 2007-163548 A | 6/2007 |
| JP | 2011-170384 A | 9/2011 |

OTHER PUBLICATIONS

Chinese Office Action with English concise explanation, Chinese Patent Application No. 201280069345.1, Mar. 30, 2015, 10 pgs.

* cited by examiner

LIGHT RECEPTACLE

BACKGROUND OF THE INVENTION

Field of the Invention

The present invention relates to a light receptacle.

Description of the Related Art

A light receptacle is known as a component for optically connecting optical fibers to each other. An example of the light receptacle is disclosed in Patent Literature 1. The light receptacle disclosed in Patent Literature 1 includes a fiber stub, a first holder, a second holder, a sleeve and a shell. According to the light receptacle disclosed in Patent Literature 1, the first and second holders hold the fiber stub with the first holder and the second holder being spaced from each other, and as a result, the first holder and the second holder are electrically insulated from each other.

However, according to the light receptacle disclosed in Patent Literature 1, when external force is applied to the first holder with the second holder fixed to an external device, stress tends to concentrate a region of the fiber stub located between the first holder and the second holder. As a result, it is difficult to improve reliability of the light receptacle against the external force.

CITATION LIST

Patent Literatures

Patent Literature 1: JP 2007-133225 A

SUMMARY OF THE INVENTION

A light receptacle according to one aspect of the present invention comprises: a column-shaped fiber stub; a cylindrical holder made of an insulating material, the holder being in contact with whole circumference of an outer peripheral surface at one end side of the fiber stub and holding the fiber stub; a sleeve being in contact with whole circumference of the outer peripheral surface at the other end of the fiber stub; a first metal case being in contact with whole circumference of an outer peripheral surface of a part of the holder and surrounding the part of the holder and the sleeve; and a second metal case being in contact with whole circumference of an outer peripheral surface of a remaining portion of the holder located outside of the first metal case, leaving a space between the first metal case and the second metal case.

DETAILED DESCRIPTION OF THE INVENTION

A light receptacle 100 and a light receptacle with an optical isolator 200 according to the one embodiment of the present invention will be described with reference to the drawings.

<Configuration of Light Receptacle 100>

Figure 1:
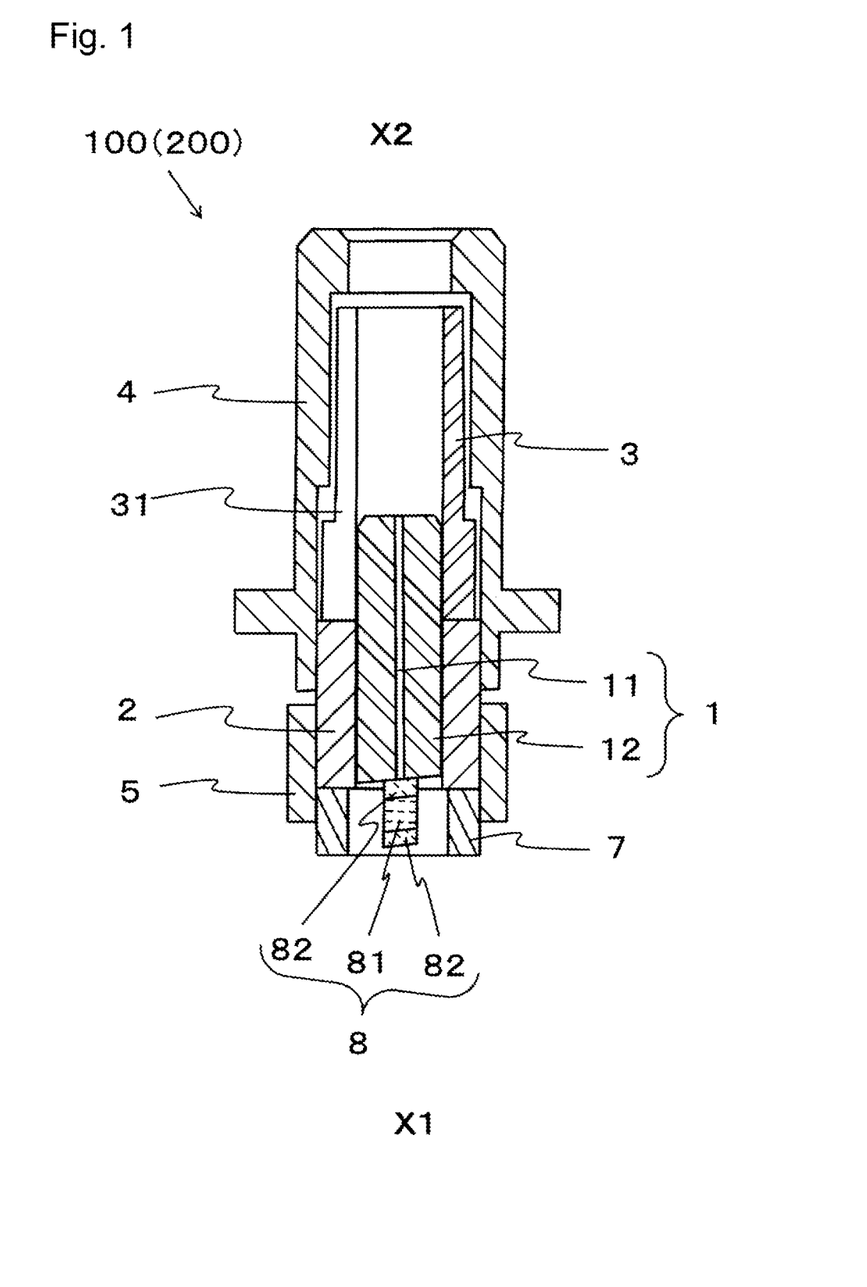
FIG. 1 is a cross-sectional view of a light receptacle of one embodiment of the present invention.

FIG. 1 shows a cross-sectional view of the light receptacle 100 of one embodiment of the present invention. As shown in FIG. 1, the light receptacle 100 of one embodiment of the present invention includes a fiber stub 1; a holder 2 holding the fiber stub 1; a sleeve 3 in contact with an outer peripheral surface of the fiber stub 1; a first metal case 4 surrounding the sleeve 3; and a second metal case 5 provided a space between the first metal case 4 and the second metal case 5.

<Configuration of Fiber Stub 1>

The fiber stub 1 is a column-shaped member including a ferrule 12 with a through hole and an optical fiber 11 inserted into the through hole of the ferrule 12. The fiber stub 1 transmits a light from a back end (one end) to a front end (the other end), or from the front end to the back end.

The ferrule 12 is a column-shaped member with the through hole penetrating though it from a front end to the back end thereof. In FIG. 1, a back end side (one end side) is indicated by X1, and a front end side (the other end side) is indicated by X2. The optical fiber 11 is inserted into the through hole of the ferrule 12 over an entire length thereof. The ferrule 12 is provided to hold the optical fiber 11.

The ferrule 12 is formed so that a back end face thereof is inclined with respect to an optical axis of the optical fiber 11. As a result, a possibility that a light being incident from an external light emitting element to the back end face of the ferrule 12 is reflected in a direction toward the light emitting element can be reduced.

The ferrule 12 has a chamfered portion at the front end thereof. The chamfered portion is formed so as to be continuous with an end face and an outer peripheral surface of the ferrule 12. As a result, a possibility that the ferrule 12 is damaged due to contact between an inner peripheral surface of the sleeve 3 and a corner of the ferrule 12 during inserting the ferrule 12 into the sleeve 3 can be reduced.

As material for the ferrule 12, ceramic material such as zirconium oxide, aluminum oxide, mullite, silicon nitride, silicon carbide or aluminum nitride is used. The material consisting of one component of these ceramic materials, or containing one or more component of these ceramic materials as a principal component can be used as a material for the ferrule 12. As another material for the ferrule 12, glass-ceramic material such as crystallized glass can be used.

As the optical fiber 11, for example, an optical fiber with an outer diameter of 125 μm defined by the TIA/EIA standards or JIS standards can be used. The optical fiber 11 is inserted into the through hole of the ferrule 12.

A front end face of the optical fiber 11 and a front end face of the ferrule 12 are spherically polished together. For this reasons, the optical fiber 11 inserted into the ferrule 12 can be in contact with an optical fiber 61 inserted into an external plug ferrule 6 when the front end face of the ferrule 12 and the plug ferrule 6 are butted to each other. As a result, optical coupling between the optical fiber 11 inserted into the ferrule 12 and the optical fiber 61 inserted into the plug ferrule 6 can be performed well.

Similarly, a back end face of the optical fiber 11 and the back end face of the ferrule 12 are obliquely polished together. This can set a close distance between an optical isolator 8 and the optical fiber 11 inserted into the ferrule 12 when the optical isolator 8 is attached to the back end face of the ferrule 12. This can suppress a loss between the optical isolator 8 and the optical fiber 11 inserted into the ferrule 12.

Now, dimensions of the fiber stub 1 will be described. As mentioned above, when the optical fiber 11 with the outer diameter of 125 μm is used as the optical fiber 11 fixed to the ferrule 12, the dimensions of the fiber stub 1 can be set to, for example, an outer diameter of 1 mm or more and 3 mm or less, and a length of 2 mm or more and 8 mm or less.

<Method of Manufacturing Fiber Stub 1>

Example of a method of manufacturing the fiber stub 1 will be described. The present manufacturing method will be described with using ceramic material containing zirconium oxide as a principal component for constituent material of the ferrule 12.

At first, a compound for constituting a compact which is an original form of the ferrule 12 is prepared. Specifically, particles of zirconium oxide and particles of yttrium oxide are sufficiently mixed and grinded with a ball mill. Binder is added to the mixed powder thereof, and the binder and the mixed powder are mixed. In this way, the compound is prepared.

Preferably, the mixed powder is a mixture of 85 to 99% by weight of zirconium oxide and 1 to 15% by weight of yttrium oxide. Especially, the powder of the mixture of 90 to 98% by weight of zirconium oxide and 2 to 10% by weight of yttrium oxide is more preferable. As the particles of zirconium oxide, a purity of zirconium oxide is preferably 95% or more, and more preferably 98% or more.

Then, the compact with a through hole is formed by the use of the prepared compound. Specifically, a mold having a structure for forming the through hole is filled with the compound. The structure for forming the through hole is, for example, a convex portion corresponding to the through hole. That is, the mold having the convex portion corresponding to the through hole is used. In order to form the compact, press molding is carried out by applying a predetermined pressure to the filled compound. Method of forming the compact is not limited to the press molding as mentioned above, and injection molding, cast molding, hydrostatic molding or extrusion molding can be employed.

Then, the obtained compact is fired to produce a sintered body. Specifically, after dewaxing the compact by placing it in a dewaxing furnace at 500 to 600° C. for 2 to 10 hours, the dewaxed compact is fired at 1300 to 1500° C. for 0.5 to 3 hours under an oxygen atmosphere to produce the sintered body. In this manner, the ferrule 12 can be manufactured.

Next, the optical fiber 11 is inserted into the through hole of the manufactured ferrule 12, a length of the optical fiber 11 being approximately equal to an entire length of the through hole. The ferrule 12 and the optical fiber 11 are adhered to each other with an adhesive. The front end face of the ferrule 12 and the front end face of the optical fiber 11 are polished together with the optical fiber 11 being inserted into the ferrule 12. In the same way, the back end face of the ferrule 12 and the back end face of the optical fiber 11 are polished together. In this way, the front end face of the ferrule 12 and the front end face of the optical fiber 11, and the back end face of the ferrule 12 and the back end face of the optical fiber 11 are polished respectively. In this manner, the fiber stub 1 can be manufactured.

<Configuration of Holder 2>

The holder 2 is a cylindrical member made of an insulating material. The holder 2 is provided to hold the fiber stub 1. An inner peripheral surface of the holder 2 holds the fiber stub 1 by contacting with whole circumference of the outer peripheral surface at a back end side of the fiber stub 1. Specifically, the back end side of the fiber stub 1 is press fitted into the holder 2. A high concentricity between the fiber stub 1 and the holder 2 can be achieved by press fitting the column-shaped fiber stub 1 into the cylindrical holder 2. A back end face of the fiber stub 1 is located so as to be surrounded by the holder 2. On an outer peripheral surface of the holder 2, the first metal case 4 and the second metal case 5 are provided apart each other.

Herein, "whole circumference of an outer periphery of a back end side" does not necessarily mean whole circumference of an outer periphery of a back end face. That is, all it need is that the inner peripheral surface of the holder 2 is in contact with whole circumference of a part of an outer peripheral surface of a back end side of the fiber stub 1. To be more specific, it may be a configuration in which the back end face of the fiber stub 1 protrudes from the holder 2.

Since the holder 2 is made of insulating material, the first metal case 4 and the second metal case 5 can be electrically insulated from each other. This can suppress that a noise signal generated at the first metal case 4 is transmitted to an external electrical circuit connected with the second metal case 5.

As material for the holder 2, ceramic material such as zirconium oxide, aluminum oxide, mullite, silicon nitride, silicon carbide or aluminum nitride is used. Since the holder 2 is made of the ceramic material, accuracy of an inner diameter of the holder 2 can be improved in comparison with the holder 2 made of metals. Furthermore, since the ceramic material is used for the holder 2, strength of the holder 2 can be improved in comparison with the case where metal material is used for the holder 2.

As another material for the holder 2, glass-ceramic material including glass such as crystallized glass; or ceramic material such as alumina can be used.

Insulating resin material such as liquid crystal polymer, PES or PEI can also be used as material for the holder 2.

Dimensions of the holder 2 are set to, for example, an outer diameter of 1.7 mm or more and 3 mm or less, and a length of 2 mm or more and 5 mm or less. The inner diameter of the holder 2 is set approximately equal to the outer diameter of the fiber stub 1.

For a method of manufacturing the holder 2, a method similar to the method of manufacturing the ferrule 12 can be used.

<Configuration of Sleeve 3>

Figure 2:
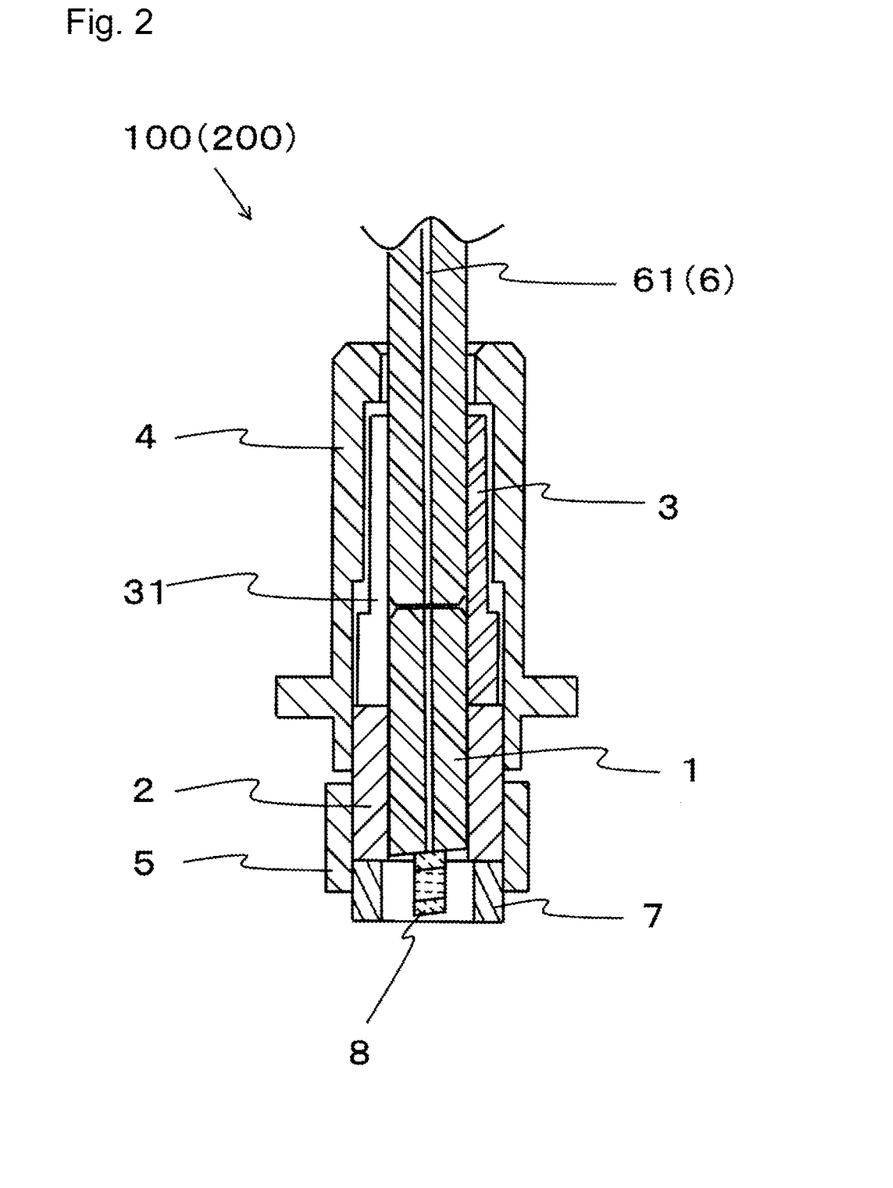
FIG. 2 is a cross-sectional view of the light receptacle shown in FIG. 1 into which a plug ferrule is inserted.

The sleeve 3 is practically a member having cylindrical shape and a slit 31. The sleeve 3 is provided for holding the plug ferrule 6 inserted into the light receptacle 100 and for aligning an optical axis thereof with that of the fiber stub 1. FIG. 2 shows the light receptacle 100 with the plug ferrule 6 being inserted into the sleeve 3.

The inner peripheral surface at the back end side of the sleeve 3 is in contact with the fiber stub 1 at the front end side. A front end side of the ferrule 12 is inserted into a back end side of the sleeve 3. The sleeve 3 is provided so as to be kept apart from the first metal case 4. This can suppress the first metal case 4 to inhibit an expansion of the outer diameter of the sleeve 3 caused by inserting the plug ferrule 6 into the sleeve 3. As a result, insertion of the plug ferrule 6 into the sleeve 3 may be facilitated since the sleeve 3 is easily elastic deformed.

An outer diameter at the back end side of the sleeve 3 is larger than the outer diameter at the front end side thereof. For this reason, a holding force at the back end side of the sleeve 3 to the fiber stub 1 is improved and is improved deformation at the front end side of the sleeve 3 for inserting the plug ferrule 6.

The back end side of the sleeve 3 is provided so as to be in contact with the holder 2. This can suppress the positional shift of the sleeve 3 in an axial direction during inserting the plug ferrule 6.

As the material for the sleeve 3, ceramic material such as zirconium oxide, aluminum oxide, mullite, silicon nitride, silicon carbide or aluminum nitride is used, similar to the ferrule 12.

As the material for the sleeve 3, instead of the ceramic material mentioned above, glass-ceramic material including glass such as crystallized glass; or ceramic material such as alumina can be used.

The sleeve 3 can be elastically deformed appropriately during inserting the plug ferrule 6 into the sleeve 3 since the sleeve 3 is provided with a slit 31. For this reason, even if there is a dimensional error between the outer diameter of the fiber stub 1 and an outer diameter of the plug ferrule 6, each optical axis thereof can be aligned by the sleeve 3. As a result, an optical connection between the fiber stub 1 and the plug ferrule 6 can be performed well.

An inner diameter of the sleeve 3 before insertion of both the ferrule 12 and the plug ferrule 6 is 1.2 mm if the outer diameters of the ferrule 12 and the plug ferrule 6 to be inserted are 1.25 mm. The slit 31 has a width of, for example, 0.1 mm or more and 0.4 mm or less.

When the ferrule 12 and the plug ferrule 6 are inserted into the sleeve 3, the sleeve 3 will be deformed so that the inner diameter thereof is 1.25 mm, and as a result the sleeve 3 can surely hold the ferrule 12 and the plug ferrule 6.

For a method of manufacturing the sleeve 3, a method similar to the method of manufacturing the ferrule 12 can be used.

<Configuration of First Metal Case 4>

The first metal case 4 is practically a cylindrical shaped member. The first metal case 4 is provided for protecting the sleeve 3. The first metal case 4 is in contact with an outer peripheral surface of a part of the holder 2. The first metal case 4 is located at a front end side of the holder 2. The front end side of the holder 2 is press fitted into the first metal case 4. The first metal case 4 is located so as to surround the sleeve 3 and the part of the holder 2 mentioned above. The sleeve 3 is surrounded so that there is a clearance gap between the first metal case 4 and the sleeve 3. An inner diameter at a front end of the first metal case 4 is smaller than the outer diameter at a front end of the sleeve 3. This can prevent to fall off the sleeve 3 from the ferrule 12. As material for the first metal case 4, metal material such as stainless steel can be used.

<Configuration of Second Metal Case 5>

The second metal case 5 is practically a cylindrical shaped member. The second metal case 5 is provided for facilitating attachment of the light receptacle 100 to an external device. The light receptacle 100 can be attached to the external device by fixing the second metal case 5 to the external device by laser welding and the like. The second metal case 5 is in contact with whole circumference of an outer peripheral surface of a remaining portion of the holder 2, the remaining portion being located outside of the first metal case 4. The second metal case 5 is provided so as to surround a back end side of the holder 2. The back end side of the holder 2 is press fitted into the second metal case 5. A back end side of the second metal case 5 protrudes from a back end face of the holder 2. The second metal case 5 is located so as to be spaced from the first metal case 4. The second metal case 5 is located so as to be spaced from the first metal case 4, and the holder 2 to which the first metal cases 4 and the second metal cases 5 are attached is made of an insulating material, therefore, the first metal cases 4 and the second metal cases 5 can be electrically insulated from each other. For the second metal case 5, metal material such as stainless steel can be used.

An outer diameter of a portion of the second metal case 5 into which the holder 2 is press fitted is larger than an outer diameter of a portion of the first metal case 4 into which the holder 2 is press fitted. Since the outer diameter of a portion of the second metal case 5 into which the holder 2 is press fitted is larger, a possibility that laser passes through the second metal case 5 when the second metal case 5 is attached to the external device by the laser welding, and as a result the laser is irradiated to the holder 2 can be suppressed.

The method for joining the second metal case 5 and the external device together is not limited to the laser welding. Specifically, brazing by the use of a solder material and the like can be performed.

Dimensions of the second metal case 5 are set to, for example, the outer diameter of 2.5 mm or more and 4.5 mm or less, and an inner diameter of 1.7 mm or more and 3 mm or less.

The light receptacle 100 of one embodiment includes the holder 2 made of insulating material for holding the fiber stub 1, and the first and second metal cases 4, 5 provided on the holder 2. This can suppress that an external force is concentrated at an region of the fiber stub 1 located between the first metal cases 4 and the second metal cases 5 when the external force is applied to the first metal case 4 or the second metal case 5. As a result, reliability of the light receptacle 100 under the external force can be improved.

Since the fiber stub 1 and the holder 2 are separate members rather an integral formed member, the reliability of the light receptacle under the external force can be more improved. To be more specific, if the fiber stub 1 and the holder 2 are integrally formed, there is a possibility that a defect generates a crack when the defect occurs in either the fiber stub 1 or the holder 2, and as a result both the fiber stub 1 and the holder 2 are broken. In such the case, there is a possibility that transmission characteristics of the optical fiber 11 held by the fiber stub 1 is worsened. However, since the fiber stub 1 and the holder 2 are the separate members, the holder 2 may protect the fiber stub 1 and may suppress the effect of the external force on the fiber stub 1 even if the defect occurs in the fiber stub 1. This can suppress a possibility that the defect generates the crack and then the fiber stub 1 is broken. Even if the defect occurs in the holder 2, the crack generated from the defect occurs in the holder 2 only and there is no effect on the fiber stub 1.

Unlike in the case that the first metal case 4 is provided on the inner peripheral surface of the holder 2, since the first metal case 4 and second metal case 5 are provided on the outer peripheral surface of the holder 2, it is not necessary to increase the inner diameter of the holder 2 in order to attach the first metal case 4 therein. Along with this, the outer diameter of the holder 2 can be reduced. For this reason, the outer diameter of the second metal case 5 can be reduced. As a result, the outer diameter of the light receptacle 100 can be reduced.

As mentioned above, the back end side of the fiber stub 1 is press fitted into the holder 2. The back end face of the fiber stub 1 is located so as to be surrounded by the holder 2. On an outer peripheral surface of the holder 2, the first metal case 4 and the second metal case 5 are provided so as to be spaced from each other. In other words, the holder 2 is provided between the fiber stub 1 and the first metal case 4. For this reason, the back end face of the sleeve 3 is in contact with the holder 2 made of the ceramic material. This can suppress a possibility that the back end face of the sleeve 3 is in contact with the first metal case 4 when the plug ferrule 6 is inserted into the sleeve 3. As a result, even if the sleeve 3 is deformed so that an end face thereof is inclined by inserting the plug ferrule 6 into the sleeve 3 under a shifted condition, a possibility that the deformed sleeve 3 scrapes the first metal case 4 by rotation of the sleeve 3 can be suppressed. This can suppress a possibility that wastes occur within the light receptacle 100.

The outer diameter of a portion of the holder 2 being in contact with the back end face of the sleeve 3 is larger than the outer diameter of the back end face of the sleeve 3. Specifically, the outer diameter of a front end face of the holder 2 is larger than the outer diameter of the back end face of the sleeve 3. This can further suppress the possibility that the back end face of the sleeve 3 is in contact with the first metal case 4. As a result, the possibility that the back end face of the sleeve 3 scrapes the first metal case 4 can be further suppressed.

<Configuration of Light Receptacle with Optical Isolator 200>

The light receptacle with an optical isolator 200 includes the light receptacle 100 mentioned above; the optical isolator 8 attached to the back end face of the fiber stub 1; and a magnet 7 surrounding the optical isolator 8. The light receptacle with an optical isolator 200 can block a retrograde light since the optical isolator 8 is attached to the back end face of the fiber stub 1.

<Configuration of Magnet 7>

The magnet 7 is provided to apply a magnetic field to the optical isolator 8. The magnet 7 is provided on the back end side of the light receptacle 100. Specifically, the magnet 7 is located on an inner peripheral surface of a portion of the second metal case 5 protruding from the holder 2. The magnet 7 is a cylindrical magnet. For the magnet 7, for example, samarium-cobalt can be used. The magnet 7 is located to as to surround the optical isolator 8.

An outer peripheral surface of the magnet 7 is joined to the inner peripheral surface of the second metal case 5, and a front end face of the magnet 7 is joined to the back end face of the holder 2. For joining, an epoxy resin can be used. In such the case, a surface roughness of the back end face of the holder 2 is preferably larger than a surface roughness of the inner peripheral surface of the second metal case 5. For this reason, the epoxy resin can easily spread over the inner peripheral surface of the second metal case 5 but can hardly spread over the back end face of the holder 2. This can suppress a possibility that the epoxy resin adheres to the optical isolator 8 or the fiber stub 1 when the magnet 7 is fixed by the epoxy resin.

As a method of achieving the surface roughness of the back end face of the holder 2 larger than that of the inner peripheral surface of the second metal case 5, following method can be used. Specifically, a sintered body of the zirconium oxide is used for the ferrule 12, and stainless steel is used for the second metal case 5. Since ceramic material such as zirconium oxide is porous, the surface roughness thereof is larger than that of a metal material such as stainless steel.

The surface roughness of the back end face of the holder 2 is preferably set to, for example, Ra 1.6. The surface roughness of the inner peripheral surface of the second metal case 5 is preferably set to, for example, Ra 0.4.

<Configuration of Optical Isolator 8>

The optical isolator 8 consists of a faraday rotator 81 and two polarizers 82 sandwiching the faraday rotator 81 therebetween.

The optical isolator 8 is attached to the back end face of the fiber stub 1. As a result, the possibility that the light being incident to the back end face of the fiber stub 1 is reflected at the back end face of the fiber stub 1 can be further suppressed.

The present invention is not limited to the above-mentioned embodiments, and various changes and modifications can be made without departing from the scope of the present invention. For example, the outer diameter of the holder 2 is constant in the present embodiment, but not limited to. Specifically, it may be a shape having a step on an outer periphery of the holder 2.

Figure 3:
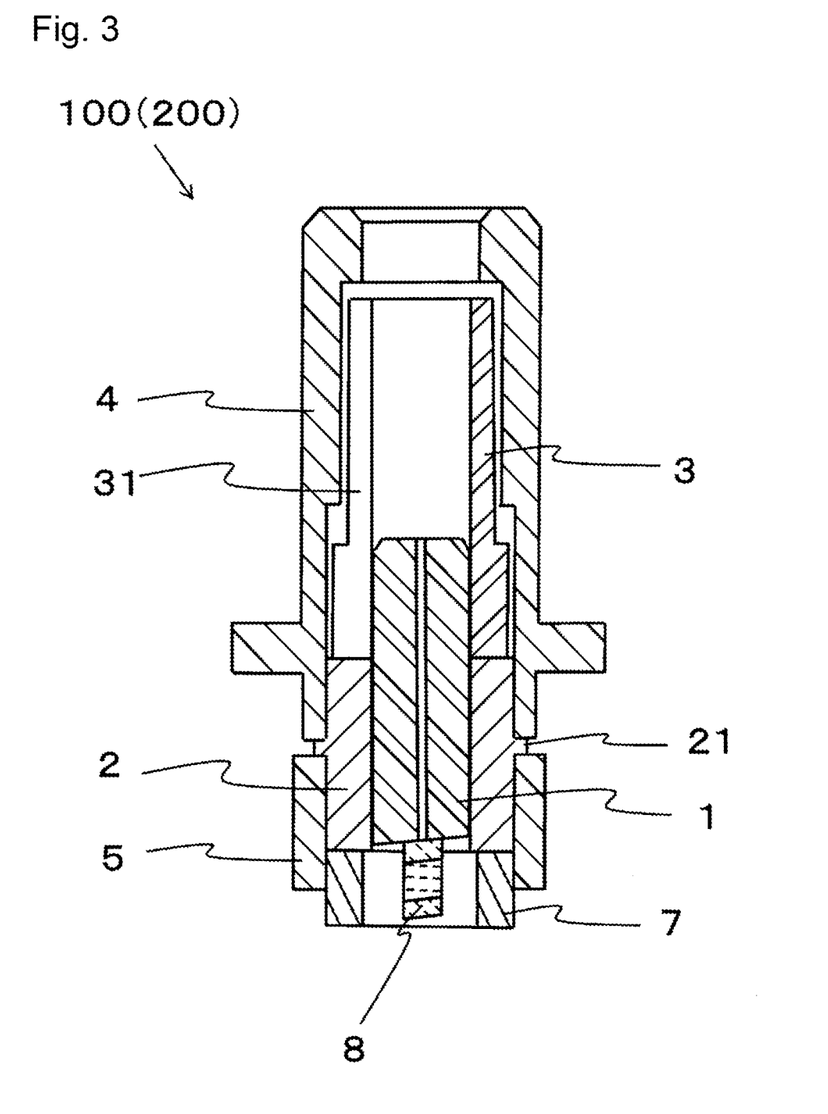
FIG. 3 is a cross-sectional view of modified example 1 of the light receptacle of the present invention.

As shown in FIG. 3, it may be a configuration in which a convex portion 21 is provided on the outer periphery of the holder 2 and is located between the first metal cases 4 and the second metal cases 5. This can suppress a possibility that the first metal cases 4 and the second metal cases 5 are electrically conducted to each other. As a result, the electrical insulation between the first metal cases 4 and the second metal cases 5 can be more ensured.

In the present embodiment, there is a gap between the first metal cases 4 and the second metal cases 5, but not limited to. Specifically, resin material may be provided between the first metal cases 4 and the second metal cases 5. This can suppress a possibility that the first metal cases 4 and the second metal cases 5 are electrically conducted to each other. Furthermore, the holder 2 is preferably covered with the resin material. As a result, since the holder 2 can be protected from an external impact, an impact resistance of the light receptacle 100 can be improved. As the resin material, for example, epoxy resin can be used.

In the present embodiment, the sleeve 3 is provided with the slit 31, but a so-called precision sleeve without the slit may be used.

Figure 4:
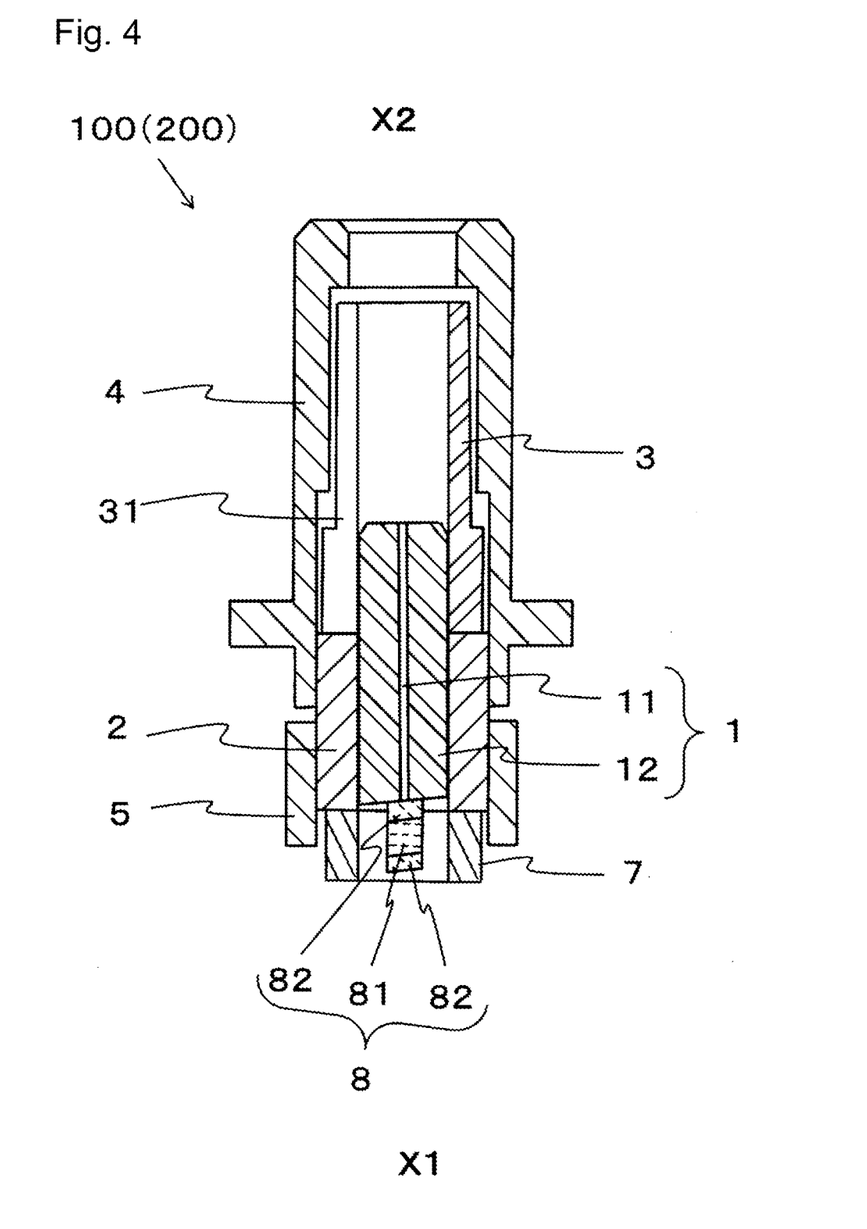
FIG. 4 is a cross-sectional view of modified example 2 of the light receptacle of the present invention.

As shown in FIG. 4, a configuration may be that the front end face of the magnet 7 is joined to the back end face of the holder 2 but the magnet 7 is not joined the inner peripheral surface of the second metal case 5. Especially, when the magnet 7 is made of samarium-cobalt, the second metal case 5 is made of stainless steel (SUS304) and the holder 2 is made of zirconium oxide, reliability under heat cycle can be improved by employing the configuration shown in FIG. 4. Specifically, when the magnet 7, the second metal case 5 and the holder 2 are made of the materials mentioned above, coefficient of linear thermal expansion of each member is as follows: the coefficient of the magnet 7 is $9.8 \times 10^{-6}$ (1/K), the coefficient of the second metal case 5 is $17.3 \times 10^{-6}$ (1/K), and the coefficient of the holder 2 is $10.5 \times 10^{-6}$ (1/K). Heat stress generated under heat cycle can be reduced when the magnet 7 and the holder 2 with the approximately equal coefficients of linear thermal expansion are joined to each other but the magnet 7 and the second metal case 5 are not joined. As a result, a possibility that the magnet 7 is detached from the holder 2 can be reduced. Preferably, as shown in FIG. 4, a clearance gap is formed between the magnet 7 and the second metal case 5. By this configuration, reliability of the light receptacle 100 under the heat cycle can be improved.

Figure 5:
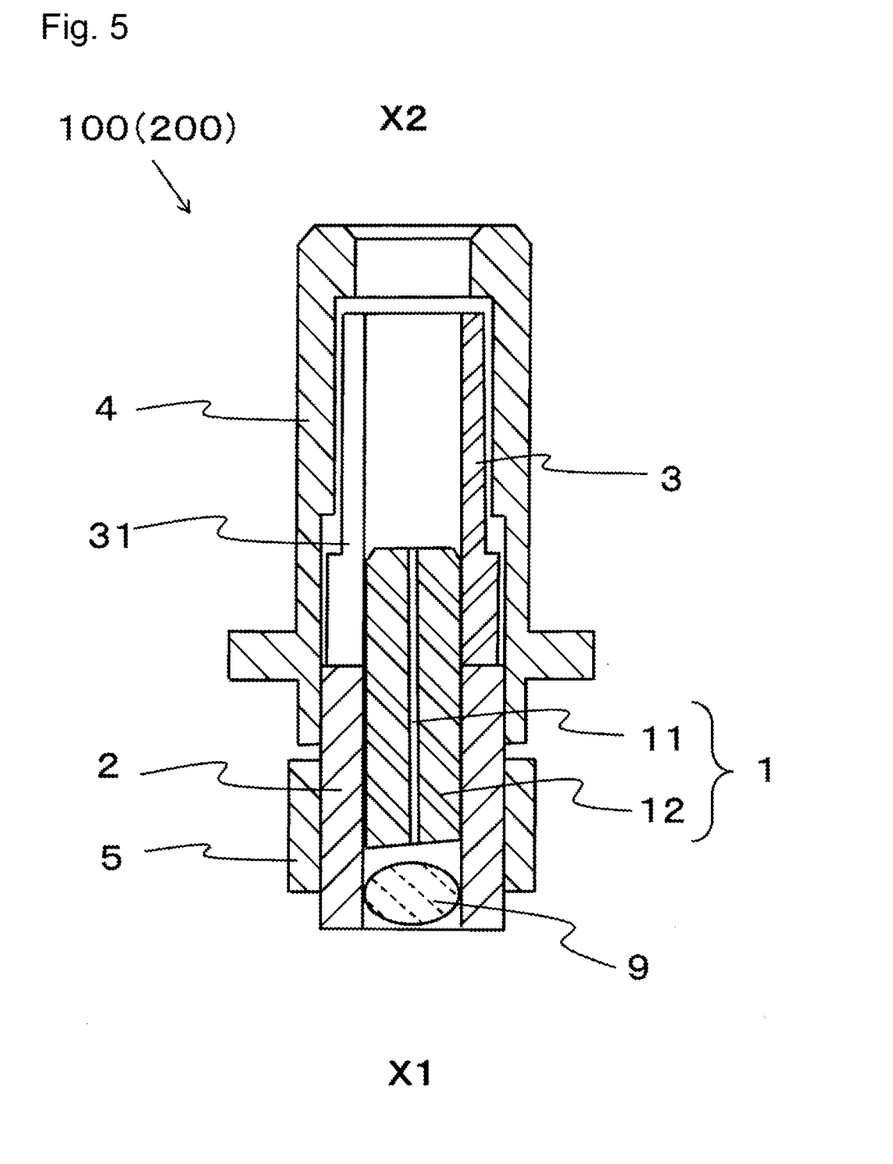
FIG. 5 is a cross-sectional view of modified example 3 of the light receptacle of the present invention.

As shown in FIG. 5, a configuration may be that the back end side of the holder 2 is extended and a lens 9 is attached to the inner peripheral surface of the holder 2. Reliability under the heat cycle can be improved in comparison with the lens 9 attached to the second metal case 5. Specifically, when the second metal case 5 is made of stainless steel (SUS304), the holder 2 is made of zirconium oxide and the lens 9 is made of glass, the coefficient of linear thermal expansion of the lens 9 is about $7.5 \times 10^{-6}$ (1/K), and therefore the heat stress generated can be reduced by attaching the lens 9 to the holder 2 with the coefficient of $10.5 \times 10^{-6}$ (1/K) rather than attaching it to the second metal case 5 with the coefficient of $17.3 \times 10^{-6}$ (1/K). This can suppress a possibility that the lens 9 is detached in comparison with the lens 9 attached to the second metal case 5. To attach the lens 9 to the holder 2, there is a joining method by the use of, for example, an epoxy resin.

Figure 6:
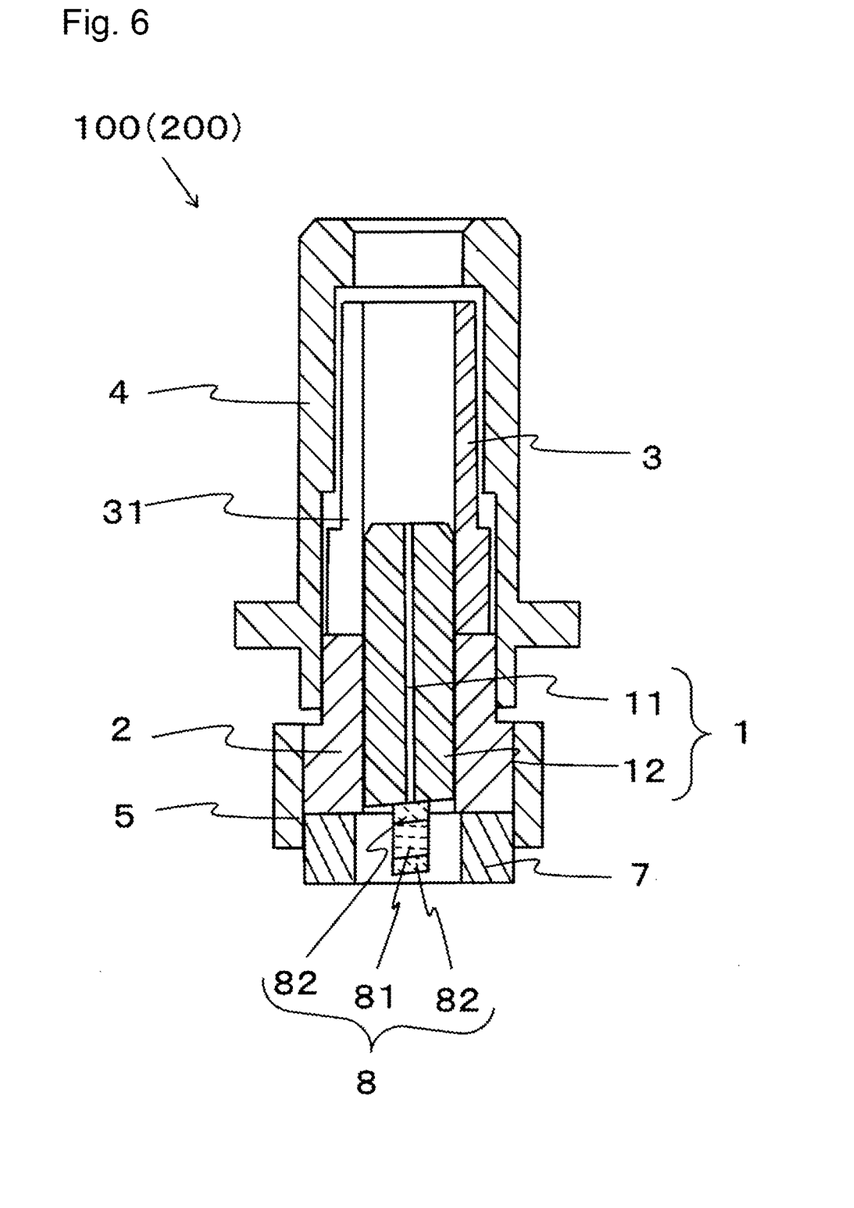
FIG. 6 is a cross-sectional view of modified example 4 of the light receptacle of the present invention.

As shown in FIG. 6, a configuration may be that the outer diameter of a region of the holder 2 being in contact with the second metal case 5 is larger than the outer diameter of a region of the holder 2 being in contact with the first metal case 4. This can suppress a possibility that the holder 2 is damaged by an impact caused by welding when the second metal case 5 and the external device are welded.

Figure 7:
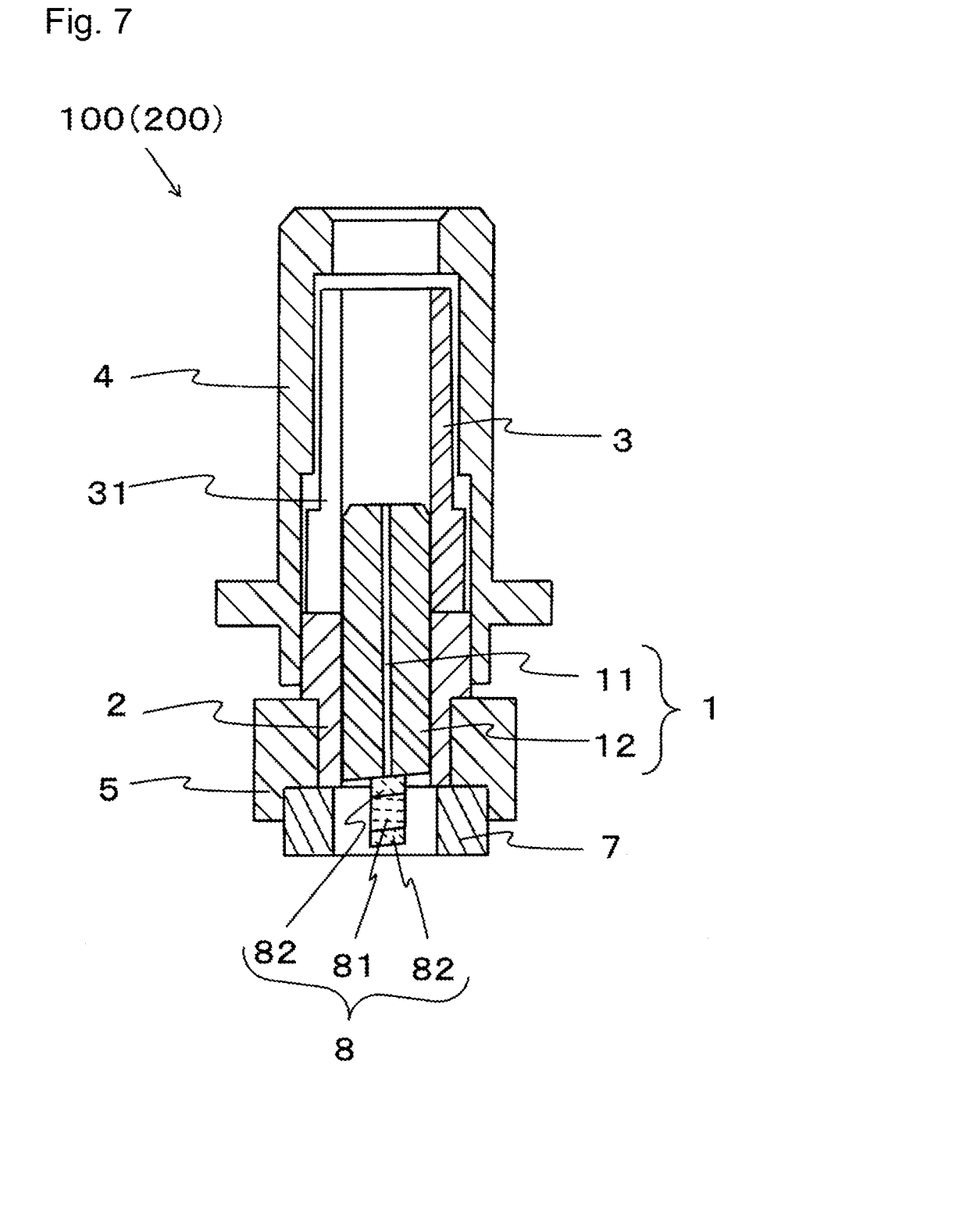
FIG. 7 is a cross-sectional view of modified example 5 of the light receptacle of the present invention.

As shown in FIG. 7, a configuration may be that the outer diameter of the region of the holder 2 being in contact with the second metal case 5 is smaller than the outer diameter of the region of the holder 2 being in contact with the first metal case 4. For this reason, a thickness of the second metal case 5 can be increased without increasing the outer diameter of the second metal case 5. As a result, an effect on the holder 2 by the impact caused by welding can be suppressed.

BRIEF DESCRIPTION OF REFERENCE NUMERALS

1: Fiber stub
11: Optical fiber
12: Ferrule
2: Holder
21: Convex portion
3: Sleeve
31: Slit
4: First metal case
5: Second metal case
6: Plug ferrule
61: Optical fiber
7: Magnet
8: Optical isolator
81: Faraday rotator
82: Polarizer
9: Lens
100: Light receptacle
200: Light receptacle with optical isolator

What is claimed is:

1. A light receptacle comprising:
   a column-shaped fiber stub;
   a cylindrical holder made of an insulating material, wherein the holder is in contact with whole circumference of an outer peripheral surface at one end side of the fiber stub and holding the fiber stub;
   a sleeve, wherein the sleeve is in contact with whole circumference of the outer peripheral surface at the other end side of the fiber stub;
   a first metal case surrounding a portion of the holder and the sleeve, wherein an inner peripheral surface of the first metal case is in contact with a whole circumference of an outer peripheral surface of the portion of the holder; and
   a second metal case being in contact with whole circumference of an outer peripheral surface of a remaining portion of the holder located outside of the first metal case, leaving a space between the first metal case and the second metal case.

2. The light receptacle according to claim 1, wherein the holder is made of a ceramic material.

3. The light receptacle according to claim 2, wherein the holder is made of zirconia while the first metal case and the second metal case are made of stainless steel.

4. The light receptacle according to claim 2, wherein the holder has a second portion, wherein the second portion is in contact with one end of the sleeve, the portion has an outer diameter larger than that of an end face of the one end of the sleeve.

5. The light receptacle according to claim 1, wherein the holder has a convex portion on the outer peripheral surface thereof, and the convex portion is located between the first metal case and the second metal case.

6. The light receptacle according to claim 1, wherein an outer diameter of a region of the holder is in contact with the second metal case and is larger than an outer diameter of a region of the holder being in contact with the first metal case.

* * * * *